(12) United States Patent
Quest

(10) Patent No.: US 10,739,049 B2
(45) Date of Patent: Aug. 11, 2020

(54) PRESSURE MONITORING COUPLER

(71) Applicant: TSI Products, Inc., Arlington, TX (US)

(72) Inventor: Michael E. Quest, Arden, NC (US)

(73) Assignee: TSI Products, Inc., Arlington, TX (US)

( * ) Notice: Subject to any disclaimer, the term of this patent is extended or adjusted under 35 U.S.C. 154(b) by 206 days.

(21) Appl. No.: 16/056,054

(22) Filed: Aug. 6, 2018

(65) Prior Publication Data

US 2019/0072306 A1 Mar. 7, 2019

Related U.S. Application Data

(60) Provisional application No. 62/541,460, filed on Aug. 4, 2017.

(51) Int. Cl.

| | | |
|---|---|---|
| *F25B 45/00* | (2006.01) | |
| *F16L 55/00* | (2006.01) | |
| *F16L 55/07* | (2006.01) | |
| *F16L 55/09* | (2006.01) | |
| *G01L 19/12* | (2006.01) | |
| *G01L 7/02* | (2006.01) | |
| *G01L 7/08* | (2006.01) | |
| *G01L 7/16* | (2006.01) | |
| *F25B 41/06* | (2006.01) | |

(52) U.S. Cl.
CPC .............. *F25B 45/00* (2013.01); *F16L 55/07* (2013.01); *F25B 41/062* (2013.01); *G01L 7/08* (2013.01); *G01L 7/082* (2013.01); *G01L 7/16* (2013.01)

(58) Field of Classification Search
CPC . F16L 55/00; F16L 55/07; F16L 55/09; F17C 2205/0323; F17C 2205/0329; F17C 2205/0338; F17C 2205/037; F17C 2205/0373; F16K 15/021; F16K 15/026; F16K 37/0008; G01L 7/024; G01L 7/084; G01L 19/12; F25B 2345/001; F25B 2345/006
USPC ........................................ 137/543.17, 543.19
See application file for complete search history.

(56) References Cited

U.S. PATENT DOCUMENTS

| | | | | |
|---|---|---|---|---|
| 2004/0261513 A1* | 12/2004 | Wiseman, Jr. | .......... | G01L 19/12 73/146 |
| 2005/0016284 A1* | 1/2005 | Bernhard | ............ | F16K 37/0058 73/705 |
| 2010/0031687 A1* | 2/2010 | Lee | ......................... | F25B 45/00 62/292 |

FOREIGN PATENT DOCUMENTS

GB 1558414 A * 1/1980 ............... G01L 7/16

* cited by examiner

*Primary Examiner* — Frantz F Jules
*Assistant Examiner* — Erik Mendoza-Wilkenfel
(74) *Attorney, Agent, or Firm* — The Van Winkle Law Firm; William G. Heedy

(57) ABSTRACT

A spring-loaded pressure indicator inside the low side quick-coupler of the automotive air conditioner recharge hose. As the user adds refrigerant, the user can look at the pressure indicator on the quick-coupler to determine either the correct refrigerant charge has been reached or that it is approaching the correct refrigerant charge so that the user can stop charging and check the vent temperature in the passenger compartment.

14 Claims, 4 Drawing Sheets

PRESSURE MONITORING COUPLER

RELATED APPLICATION

This application claims the benefit of U.S. Provisional Patent Application Ser. No. 62/541,460 filed on Aug. 4, 2017.

FIELD OF THE INVENTION

This invention relates to pressure indicators for quick couplers of an automotive air conditioner recharge hose and, more particularly, a spring-loaded pressure indicator inside the low side quick coupler of the automotive air conditioner recharge hose.

BACKGROUND OF THE INVENTION

Most automotive mechanics and many do-it-yourselfers have long used a gauge to determine correct refrigerant fill. They also generally use either a thermometer or feel to determine the actual vent temperature the air conditioner is producing to further assist in the determination of correct refrigerant fill.

Automobile air conditioners traditionally include an orifice tube or expansion valve. Because an expansion valve is essentially a fixed valve with free flow of the refrigerant, the pressure as measured on both the high and low side is a function of both the amount of refrigerant therein, as well as the ambient temperature. A suitable pressure range for the correct refrigerant fill was established many years ago, which is based on increasing the pressure as the ambient temperature rises. More recently, automobile manufacturers have started using thermostatic expansion valves with sensing bulbs that are designed to meter, or restrict, the flow of refrigerant into the evaporator, thereby providing more efficient cooling by controlling the super heating at the evaporator outlet. The control of the metering is located at the outlet of the evaporator. These automobile manufacturers use the evaporator outlet temperature, independent of the ambient temperature, to regulate the thermostatic expansion valves, which meters the refrigerant flow and sets a maximum predetermined pressure at the evaporator outlet.

For systems having a thermostatic expansion valve and sensing bulbs, as refrigerant is added during servicing, the pressure on the low side rises until it reaches this predetermined maximum level. If this pressure level is below the gauge's established correct fill range, even if the system is fully charged, adding additional refrigerant will not bring the pressure reading up to gauge's established fully charge pressure reading. As additional refrigerant is added, the excessive pressure builds up on the high side and can only be measured using a high side gauge. Because the fully charged pressure on systems using a thermostatic expansion valve and sensing bulb remains constant and the gauge's fully charged requirement rises as the ambient temperature goes up, the higher the ambient temperature the larger the gap between the system being fully charged and it showing fully charged on the low side gauge. In these cases, using only a low side gauge can potentially cause too much refrigerant to be added and result in damage to the compressor or other problems associated with overcharging.

In view of the above, there exists a need for pressure monitoring quick coupler for providing a real-time indication of the refrigerant fill level as refrigerant is added.

SUMMARY OF THE INVENTION

In accordance with one form of the present invention there is provided a low side quick coupler for use in combination with an automotive air conditioner recharge hose and a pressurized fluid dispensing canister, the low side quick coupler including a main body surrounding a cavity; a spring-loaded pressure indicator for indicating refrigerant charge; and wherein the spring-loaded pressure indicator moves upwards in response to increased pressure within the cavity for indicating to a user the current refrigerant charge. In one embodiment, the spring-loaded pressure indicator is a spring-loaded disc. A transparent housing may be secured to the main body and surround the spring-loaded pressure indicator. An elastomeric diaphragm may be included for preventing leakage of the pressurized fluid. The spring-loaded pressure indicator may be preset to operate within a predetermined PSI range, such as, but not limited to a starting minimum of 20 PSI and a completed maximum of 60 PSI.

In accordance with another form of the present invention there is provided a low side quick coupler for indicating refrigerant charge and being provided for use in combination with an automotive air conditioner recharge hose and fluid dispensing canister, the low side quick coupler including a main body including an inner surface defining a cavity; an output nozzle including an interior surface surrounding a channel in fluid flow communication with the cavity of the main body, the output nozzle being sized and configured for attachment to the recharge hose; a button including a top surface and a bottom surface, the top surface being located external of the cavity of the main body and the bottom surface being located internal the cavity of the main body; a plunger in the cavity of the main body; an elastomeric diaphragm in the cavity of the main body; the button being depressible by a user for downwardly displacing the plunger for permitting passage of a flow of fluid from the fluid dispensing canister through the channel of the output nozzle; and wherein pressure from the fluid dispensing canister forces the plunger upwards and causing the elastomeric diaphragm to flex upwards a distance in correlation with the amount of pressure applied by the fluid dispensing canister, thereby causing the top surface of the button to move upwards for indicating to the user the current refrigerant charge.

In accordance with another form of the present invention there is provided a low side quick coupler for indicating refrigerant charge and being provided for use in combination with an automotive air conditioner recharge hose and fluid dispensing canister, the low side quick coupler including a main body including an inner surface defining a cavity; an output nozzle including an interior surface surrounding a channel in fluid flow communication with the cavity of the main body, the output nozzle being sized and configured for attachment to the recharge hose; a button including a top surface and a bottom surface; an elastomeric diaphragm in the cavity of the main body; the button being depressible by a user for permitting passage of a flow of fluid from the fluid dispensing canister through the channel of the output nozzle; and wherein pressure from the fluid dispensing canister causes the elastomeric diaphragm to flex upwards a distance in correlation with the amount of pressure applied by the fluid dispensing canister, thereby causing the top surface of the button to move upwards for indicating to the user the current refrigerant charge.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 1:
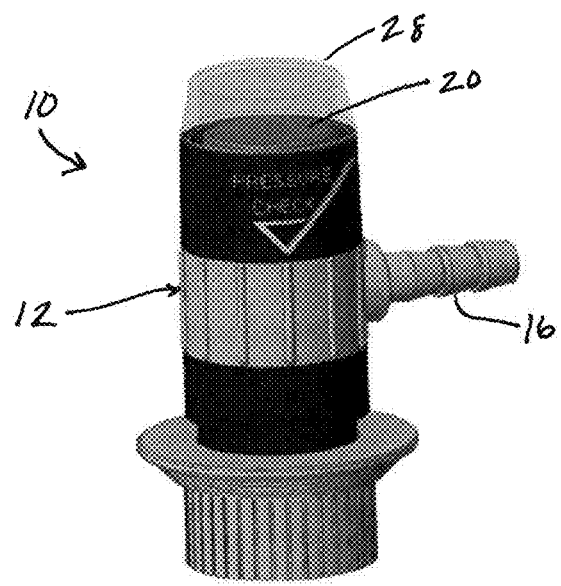
FIG. 1 is a perspective view of the low side quick coupler of the present invention.
Figure 2:
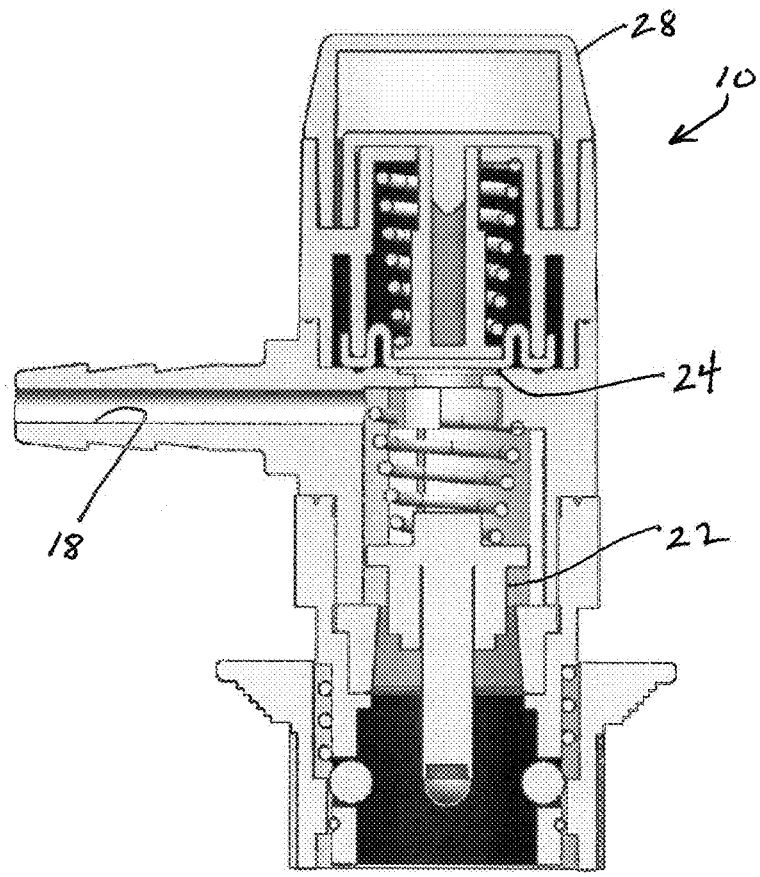
FIG. 2 is a side elevational view shown in cross section of the low side quick coupler of the present invention.
Figure 3:
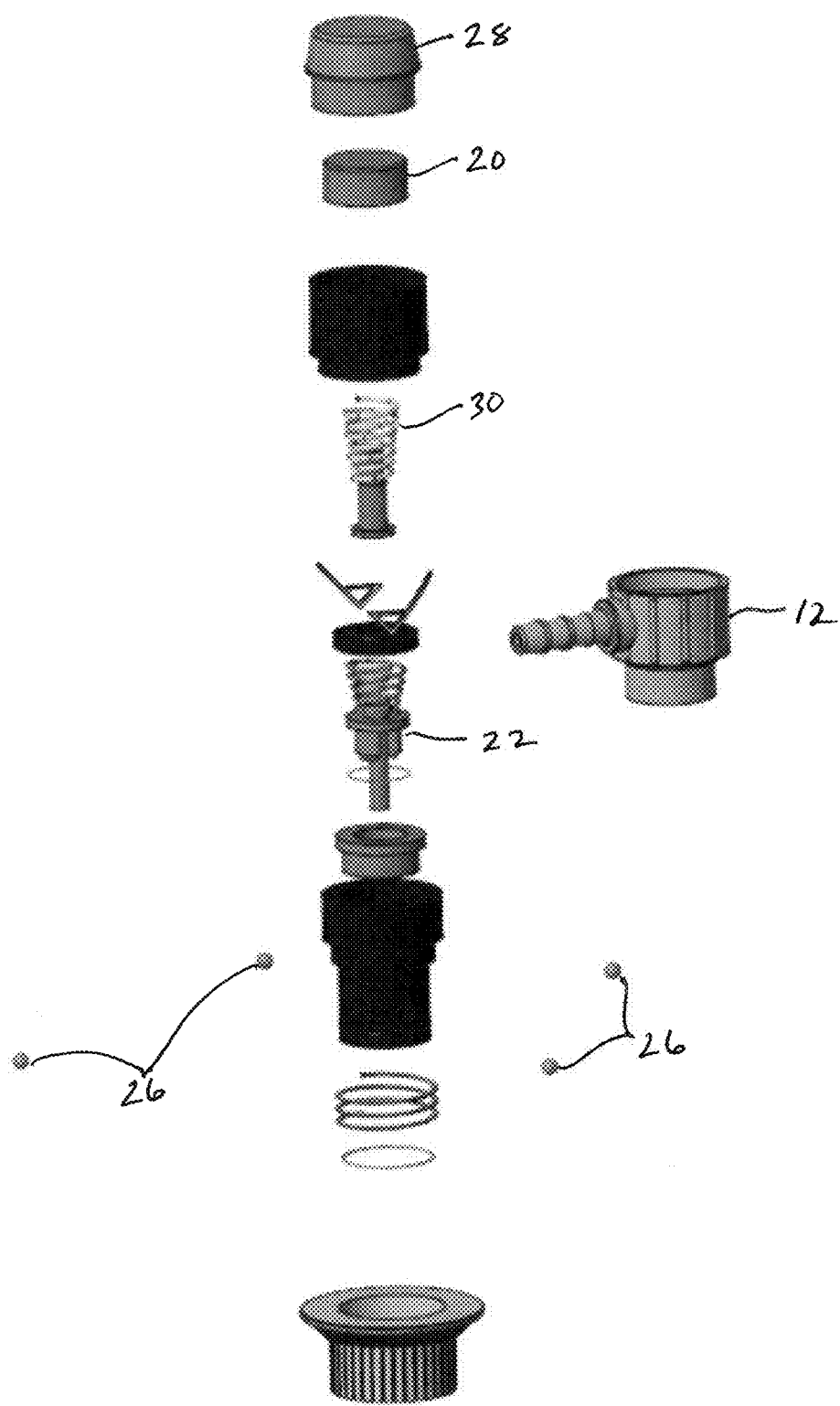
FIG. 3 is an exploded view of the low side quick coupler of the present invention.

Referring to the several views of the drawings, the low side quick coupler for indicating refrigerant charge is described and generally indicated as 10. The low side quick coupler 10 is provided for use in combination with an automotive air conditioner recharge hose and pressurized fluid dispensing canister. Generally, as the user adds refrigerant, the user can look at the pressure indicator on the low side quick coupler 10 to determine that either the correct refrigerant charge has been reached or that it is approaching the optimum refrigerant charge so that the user can stop charging and check the vent temperature in the passenger compartment.

Referring to FIGS. 1-7, the low side quick coupler 10 for indicating refrigerant charge includes a main body 12 defining a cavity 14 and an output nozzle 16 including an interior surface surrounding a channel 18 in fluid flow communication with the cavity 14 of the main body 12. The output nozzle 16 is sized and configured for attachment to the recharge hose for delivery of the pressurized fluid.

A button 20 includes a top surface and a bottom surface, the top surface being located external of the cavity 14 of the main body 12 and the bottom surface being located internal the cavity 14 of the main body 12. The button 20 further serves as a pressure indicator. In one embodiment, the pressure indicator is a spring-loaded disc.

A plunger 22 is housed in the cavity 14 of the main body 12. An elastomeric diaphragm 24 is housed in the cavity 14 of the main body 12. The button 20 is depressible by a user for downwardly displacing the plunger 22 for permitting passage of a flow of pressurized fluid from the fluid dispensing canister through the channel 18 of the output nozzle 16. When not in operation, pressure from the fluid dispensing canister forces the plunger 22 upwards causing the elastomeric diaphragm 24 to flex upwards a distance in correlation with the amount of pressure applied by the fluid dispensing canister, thereby causing the top surface of the button 20 to move upwards for indicating to the user the current refrigerant charge.

Figure 4:
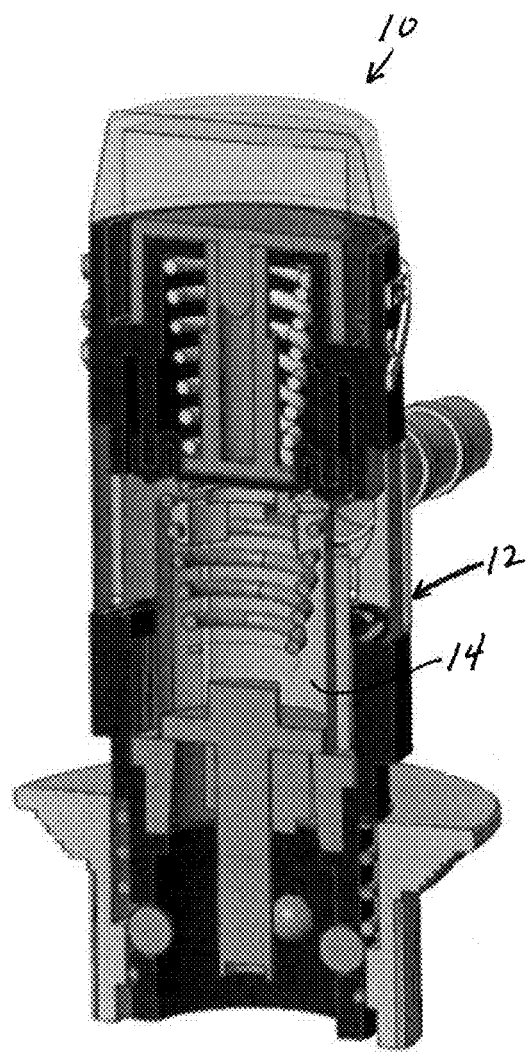
FIG. 4 is a perspective view, shown in cross section, of the low side quick coupler of the present invention.
Figure 5:
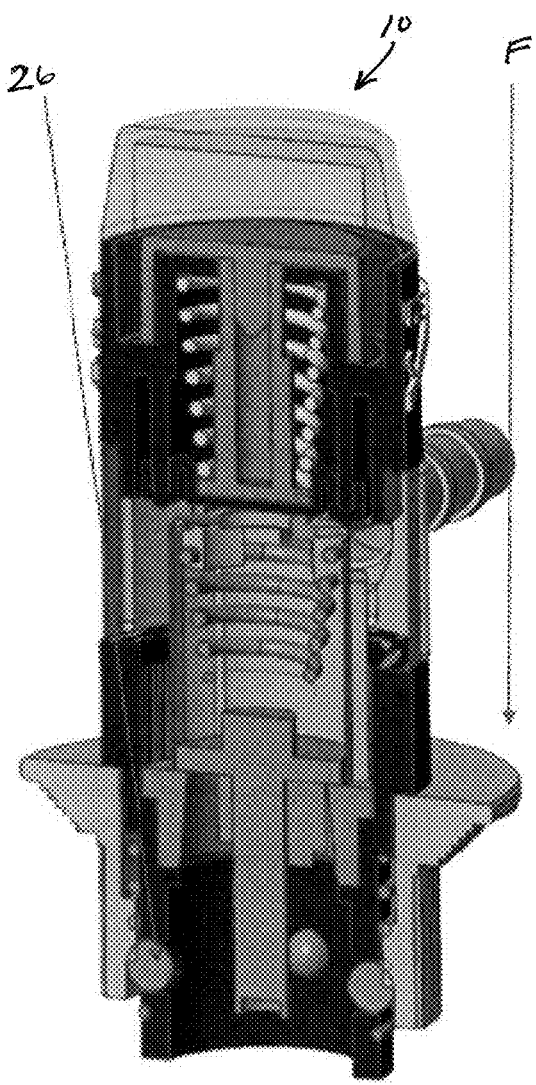
FIG. 5 is a perspective view, shown in cross section, of the low side quick coupler of the present invention.
Figure 6:
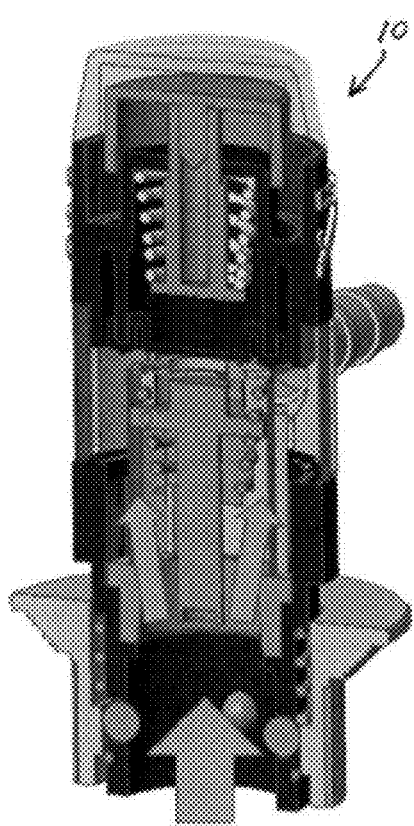
FIG. 6 is a perspective view, shown in cross section, of the low side quick coupler of the present invention.
Figure 7:
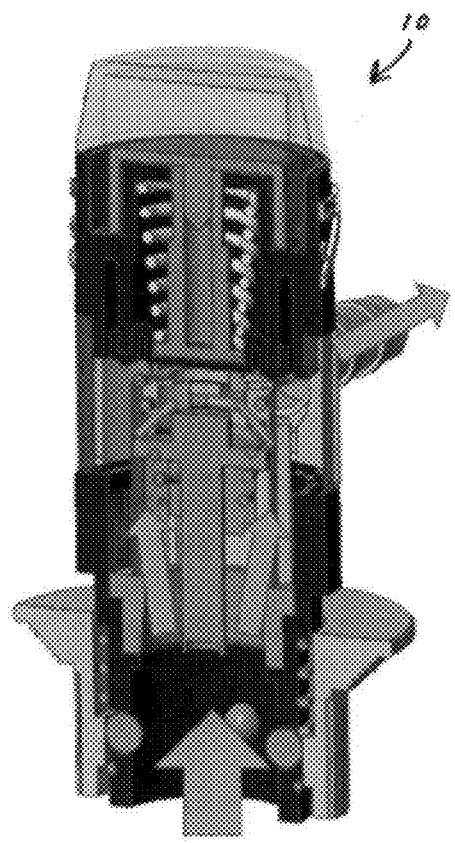
FIG. 7 is a perspective view, shown in cross section, of the low side quick coupler of the present invention.

Referring to FIG. 4, the low side quick coupler 10 is shown unattached to the canister and without increased pressure in the cavity 14. FIG. 5 illustrates attachment of the low side quick coupler 10 wherein a force F is applied thereby causing the plurality of ball bearings 26 to retract and slip over the collar. FIG. 6 illustrates pressure from the canister flowing into the cavity 14 and pushing the plunger 22 upwards to seal off flow of the pressurized fluid to the channel 18 of the output nozzle 16. The plunger 22 flexes the elastomeric diaphragm 24 thereby pushing the button 20 upwards. FIG. 7 illustrates the button 20 being depressed for displacing the plunger 22 to permit passage of a flow of fluid from the fluid dispensing canister beyond the seal and through the channel 18 of the output nozzle 16.

A spring 30 is structured and disposed for providing resistance when the button 20 is depressed by the user for downwardly displacing the plunger 22.

In one embodiment, the spring-loaded pressure indicator is a spring-loaded disc. A transparent housing 28 may be secured to the main body and surround the spring-loaded pressure indicator. The spring-loaded pressure indicator may be preset to operate within a predetermined PSI range, such as, but not limited to a starting minimum of 20 PSI and a completed maximum of 60 PSI.

While the present invention has been shown and described in accordance with several preferred and practical embodiments, it is recognized that departures from the instant disclosure are contemplated within the spirit and scope of the present invention.

What is claimed is:

1. A low side quick coupler for use in combination with an automotive air conditioner recharge hose and a pressurized fluid dispensing canister, the low side quick coupler comprising:
    a main body surrounding a cavity;
    a spring-loaded pressure indicator for indicating refrigerant charge;
    a button being depressible by a user for downwardly displacing the plunger for permitting passage of a flow of fluid from the fluid dispensing canister through the channel of the output nozzle; and
    wherein the spring-loaded pressure indicator moves upwards in response to increased pressure within the cavity for indicating to a user the current refrigerant charge.

2. The low side quick coupler as recited in claim 1 wherein the spring-loaded pressure indicator is a spring-loaded disc.

3. The low side quick coupler as recited in claim 1 further comprising a transparent housing that is secured to the main body and surrounds the spring-loaded pressure indicator.

4. The low side quick coupler as recited in claim 1 further comprising an elastomeric diaphragm for preventing leakage of the fluid.

5. The low side quick coupler as recited in claim 1 wherein the spring-loaded pressure indicator is preset to operate within a predetermined PSI range.

6. The low side quick coupler as recited in claim 5 wherein the spring-loaded pressure indicator has a starting minimum pressure of 20 psi which begins to move the spring-loaded indicator upwards away a first distance from the cavity, and a completed maximum pressure when the spring-loaded indicator is a second distance, which is longer than the first distance away from the cavity at 60 psi.

7. A low side quick coupler for indicating refrigerant charge and being provided for use in combination with an automotive air conditioner recharge hose and fluid dispensing canister, the low side quick coupler comprising:
    a main body including an inner surface defining a cavity;
    an output nozzle including an interior surface surrounding a channel in fluid flow communication with the cavity of the main body, the output nozzle being sized and configured for attachment to the recharge hose;
    a button including a top surface and a bottom surface, the top surface being located external of the cavity of the main body and the bottom surface being located internal the cavity of the main body;
a plunger in the cavity of the main body;
an elastomeric diaphragm in the cavity of the main body;
the button being depressible by a user for downwardly displacing the plunger for permitting passage of a flow of fluid from the fluid dispensing canister through the channel of the output nozzle; and
wherein pressure from the fluid dispensing canister forces the plunger upwards and causing the elastomeric diaphragm to flex upwards a distance in correlation with the amount of pressure applied by the fluid dispensing canister, thereby causing the top surface of the button to move upwards for indicating to the user the current refrigerant charge.

8. The low side quick coupler as recited in claim 7 further comprising a spring that is structured and disposed for providing resistance when the button is depressed by the user for downwardly displacing the plunger.

9. The low side quick coupler as recited in claim 7 wherein the spring-loaded pressure indicator is preset to operate within a predetermined PSI range.

10. The low side quick coupler as recited in claim 9 wherein the spring-loaded pressure indicator has a starting minimum pressure of 20 psi which begins to move the spring-loaded indicator upwards away a first distance from the cavity, and a completed maximum pressure when the spring-loaded indicator is a second distance, which is longer than the first distance away from the cavity at 60 psi.

11. A low side quick coupler for indicating refrigerant charge and being provided for use in combination with an automotive air conditioner recharge hose and fluid dispensing canister, the low side quick coupler comprising:

a main body including an inner surface defining a cavity;
an output nozzle including an interior surface surrounding a channel in fluid flow communication with the cavity of the main body, the output nozzle being sized and configured for attachment to the recharge hose;
a button including a top surface and a bottom surface;
an elastomeric diaphragm in the cavity of the main body;
the button being depressible by a user for permitting passage of a flow of fluid from the fluid dispensing canister through the channel of the output nozzle; and
wherein pressure from the fluid dispensing canister causes the elastomeric diaphragm to flex upwards a distance in correlation with the amount of pressure applied by the fluid dispensing canister, thereby causing the top surface of the button to move upwards for indicating to the user the current refrigerant charge.

12. The low side quick coupler as recited in claim 11 further comprising a spring that is structured and disposed for providing resistance when the button is depressed by the user for downwardly displacing the plunger.

13. The low side quick coupler as recited in claim 11 wherein the spring-loaded pressure indicator is preset to operate within a predetermined PSI range.

14. The low side quick coupler as recited in claim 13 wherein the spring-loaded pressure indicator has a starting minimum pressure of 20 psi which begins to move the spring-loaded indicator upwards away a first distance from the cavity, and a completed maximum pressure when the spring-loaded indicator is a second distance, which is longer than the first distance away from the cavity at 60 psi.

* * * * *